United States Patent Office 3,751,428
Patented Aug. 7, 1973

3,751,428
1-SUBSTITUTED BENZOYL-2-TRIFLUORO-
METHYLBENZIMIDAZOLES
Reinhard Sarges, Old Mystic, Conn., assignor to
Pfizer Inc., New York, N.Y.
No Drawing. Original application Mar. 20, 1968, Ser. No. 714,416, now Patent No. 3,625,954, dated Dec. 7, 1971. Divided and this application Oct. 4, 1971, Ser. No. 186,446
Int. Cl. C07d 49/38
U.S. Cl. 260—309.2     4 Claims

ABSTRACT OF THE DISCLOSURE

Selected 1-benzoylbenzimidazoles having at the 2-position hydrogen, $CF_3$, —$NHCOCF_3$, —$CH_2CH_2CO_2H$, methyl or pyridyl and 1-benzoylbenzotriazoles having utility as anti-inflammatory agents and the preparation thereof by acylation of the appropriate benzimidazole or benzotriazole with a benzoyl halide.

CROSS-REFERENCE TO RELATED APPLICATIONS

This is a divisional application of copending application Ser. No. 714,416, filed Mar. 20, 1968, and now U.S. Pat. 3,625,954, Dec. 7, 1971.

BACKGROUND OF THE INVENTION

This invention relates to a series of novel 1-aroylbenzimidazoles and 1-aroylbenzotriazoles having valuable therapeutic properties. In particular, this invention is concerned with the preparation of novel 1-aroylbenzimidazoles and 1-aroylbenzotriazoles possessing antiinflammatory activity in mammals.

Although 1-benzoylbenzimidazole, 1-benzoylbenzotriazole and a limited number of other substituted 1-aroyl benzimidazoles and benzotriazoles are known, the compounds of the present invention have now been prepared for the first time.

The discovery and preparation of therapeutic agents effective in alleviating arthritic disorders presents a formidable challenge, particularly in view of the fact that its etiology and pathogenosis are not presently fully understood, although various theories regarding the cause of the disease have been advanced. Human arthritic disorders, particularly rheumatoid arthritis, are evidenced by swelling, pain, tenderness, and inflammation of the joints. During the early stages of the disease, the joints usually appear red and contain considerable amounts of fluid.

Various antiinflammatory agents, e.g., the salicylates, have been found to alleviate the subacute symptoms of the arthritis and have been widely used therapeutically to treat subjects afflicted with the disease.

Many of the compounds described in the instant invention inhibit artificially induced edema formation in rats, a property which is considered by those skilled in the art as being indicative of a compound's potential usefulness as an antiinflammatory agent in the treatment of arthritic disorders.

SUMMARY OF THE INVENTION

This invention comprises the preparation of novel 1-aroylbenzimidazoles and 1-aroylbenzotriazoles having anti-inflammatory activity. Among the novel 1-aroylbenzimidazoles described herein are those having the following structural formulas:

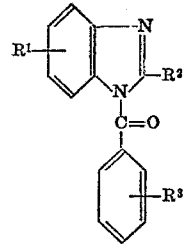

wherein $R^1$ can be $CH_3$, $CO_2H$, Cl, and Br; $R^2$ can be $CF_3$, —$NHCOCF_3$, and —$CH_2CH_2CO_2H$ and $R^3$ can be either H, Cl, or Br;

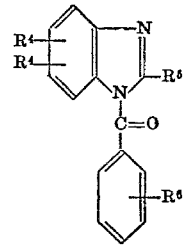

$R^4$ can be either —$CH_3$ or —$OCH_3$; $R^5$ may be either H or —$CH_3$; and $R^6$ can be —$CO_2H$, —$N(CH_3)_2$, —$OCH_2CO_2H$, or $OCH_2CO_2CH_2C_6H_5$, provided that $R^4$ is $CH_3O$— when $R^6$ is H;

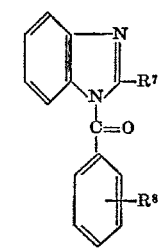

wherein $R^7$ is either 2-pyridyl or —$CF_3$ and $R^8$ is either Cl, Br, or —$OCH_2CO_2H$.

The 1-aroylbenzotriazoles included within the instant invention include those having the structural formulas:

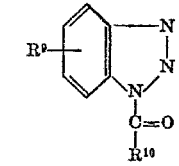

wherein $R^9$ is either Cl or Br; and $R^{10}$ may be phenyl, dimethylaminophenyl, 3,4,5-trimethoxyphenyl and 2,6-dimethoxyphenyl.

We have surprisingly discovered that many of the novel compounds described herein, in contrast to the known compounds of the series, exhibit a high degree of anti-inflammatory activity in mammals, and are effective in preventing and inhibiting the formation of granulomatous tissue. Consequently, these compounds are of value in the treatment of those arthritic disorders which are responsive to treatment with anti-inflammatory agents.

DETAILED DESCRIPTION OF THE INVENTION

The 1-aroylbenzimidazoles and 1-aroylbenzotriazoles of the present invention are conveniently prepared by reacting the appropriate benzimidazole or benzotriazole with an aroyl halide, preferably the chloride, in an inert anhydrous solvent in the presence of an organic base. Among the many solvents that may be employed are benzene, dialkyl ethers, and tetrahydrofuran. We have found tetrahydrofuran to be a convenient solvent with these reactions. The preferred organic bases include the trialkylamines such as triethylamine. Where the benzimidazole or benzotriazole contains a carboxy group in the phenyl portion of the molecule, it is preferred to use up to 2 moles of organic base for every mole of aroyl halide used; although it should be understood that this aspect of the reaction is not critical. In those situations where it is desired to prepare a 1-aroylbenzimidazole containing a carboxyl function, e.g., $-CO_2H$ and $-OCH_2CO_2H$, in the aroyl portion of the compound, the preferred synthetic scheme is to aroylate the benzimidazole with an aroyl halide containing the benzyl ester of the desired carboxy functionality and then remove the benzyl group of the resultant compound by hydrogenolysis to provide the desired compound.

Thus, for example, the procedure in Chart I has been used in preparing a 1-aroylbenzimidazole containing a $-OCH_2CO_2H$ functionality in the 1-aroyl moiety.

CHART I

Preparation of intermediates

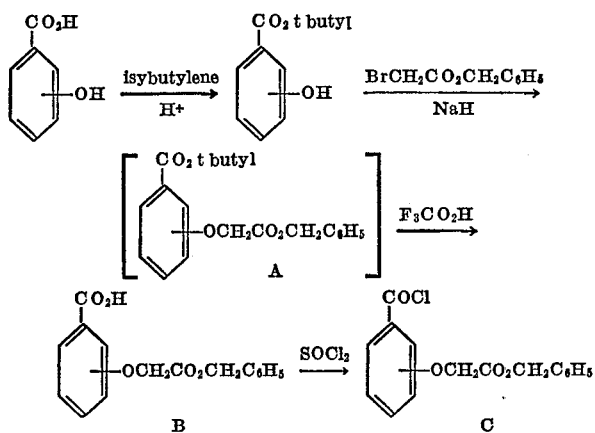

A hydroxybenzoic acid is converted to the corresponding t-butyl ester by reaction with isobutylene in the presence of a mineral acid. The ester is then reacted with a benzyl haloacetate in the presence of sodium or potassium hydride to give the diester A (see Chart I), which is usually not isolated and purified, but is converted with trifluoroacetic acid to the substituted benzoic acid B, shown in Chart I. This latter compound is converted to the corresponding acid halide C, which is used to benzoylate the benzimidazoles and benzotriazoles. If desired, the benzyl group in the ester moiety of the resultant compounds can be easily removed by hydrogenolysis to the corresponding acid functionality, i.e., $-OCH_2CO_2H$.

A similar procedure is followed where it is desired to prepare a carboxy-containing 1-aroyl moiety. Thus, the monoester of a phthalic acid is converted to the corresponding acid chloride, which is then used for aroylation. Here again, after the 1-aroylbenzimidazole is prepared, the carbobenzoxy group is easily transformed into the corresponding carboxy group by hydrogenolysis.

Similarly, we prefer to prepare the 1-aroyl-2-(2'-carboxyethyl)benzimidazoles by first aroylating the benzyl ester of the 2-(2'-carboxyethyl)benzimidazole and then converting the benzyl ester moiety of the resultant compound to the carboxy functionality by hydrogenolysis.

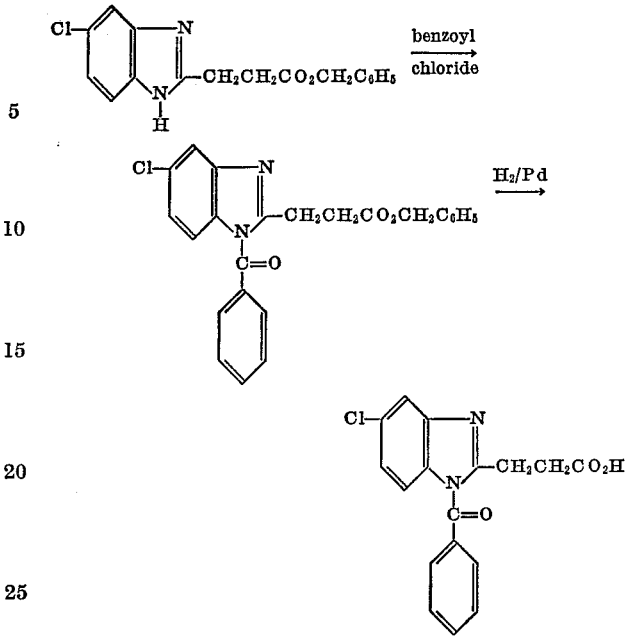

In those cases where the phenyl group of the 2-(2'-carboxyethyl)benzimidazole also contains a carboxy group, we also prefer to convert this group to the carbobenzoxy group prior to aroylation. The benzyl moiety of this group is then removed in the subsequent hydrogenolysis.

Throughout this application the benzimidazoles and benzotriazoles are numbered in accordance with the recommendations of Chemical Abstracts. Thus, the benzimidazoles and benzotriazoles are numbered as indicated below with the nitrogen bearing the hydrogen atom being assigned position No. 1.

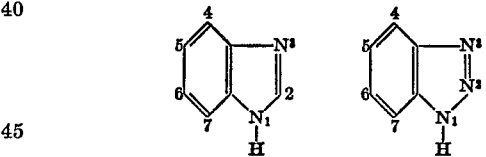

Table A contains results illustrating the anti-inflammatory activity of a number of the compounds of the present invention, as determined by the inhibition of edema formation in the hind paw of rats (Charles River Strain; average weight 170 g.) in response to a sub-plantar injection of carrageenin ("rat-foot edema test"). The experimental procedures followed are those of Winter et al., as reported in Proc. Soc. Exp. Biol., New York, 111, 544 (1962) and J. Pharmacol. Exp. Therap., 141, 369 (1963).

In this test, unanesthetized adult male albino rats of 150 g. to 190 g. body weight are numbered, weighed, and an ink mark placed on the right lateral malleolus. Each paw is immersed in mercury exactly to the ink mark. The mercury is contained in a glass cylinder, connected to a Statham Pressure Transducer. The output from the transducer is fed through a control unit to a microvoltometer. The volume of mercury displaced by the immersed paw is read. Drugs are given by gavage. One hour after drug administration, edema is induced by injection of 0.05 ml. of 1% solution of carrageenin into the plantar tissue of the marked paws. Immediately thereafter, the volume of the injected foot is measured. The increase in foot volume 3 hours after the injection of carrageenin constitutes the individual response. The increase in volume of the feet of the drug-treated animals are compared with those just receiving vehicle alone.

On the same day that the compound under investigation is being tested, the above test procedure is also conducted with a second group of animals using acetylsalicylic acid (aspirin) instead, and the effectiveness of each compound is then expressed relative to aspirin.

TABLE A.—ANTI-INFLAMMATORY ACTIVITY OF COMPOUNDS OF THE PRESENT INVENTION

| Compound | Rat foot edema test | | |
|---|---|---|---|
| | Dosage, mg./kg. | Inhibition of edema, percent | Inhibition of edema relative effectiveness compared to aspirin |
| 1-(3',4',5'-trimethoxybenzoyl)-benzimidazole | 100 | 24.8 | 0.48 |
| 1-(4'-dimethylaminobenzoyl)-5,6-dimethylbenzimidazole | 100 | 48.0 | 0.78 |
| 1-(4'-dimethylaminobenzoyl)-5,6-dimethylbenzimidazole | 33 | 14.7 | 0.33 |
| 1-[4'-(α-benzyloxycarbonyl)-methoxybenzoyl]5,6-dimethylbenzimidazole | 100 | 33.3 | 0.69 |
| | 33 | 27.4 | 0.57 |
| 1-(4'-α-carboxymethoxybenzoyl)-5,6-dimethylbenzimidazole | 100 | 14.5 | 0.30 |
| 1-(4'-carboxybenzoyl)-5,6-dimethylbenzimidazole | 100 | 25.3 | 0.36 |
| 1-(4'-chlorobenzoyl)-2-trifluoromethyl-benzimidazole | 100 | 24.4 | 0.38 |
| 1-(4'-α-carboxymethoxybenzoyl)-2-trifluoromethylbenzimidazole | 100 | 31.9 | 0.55 |
| | 33 | 28.3 | |
| 1-benzoyl-2-trifluoromethyl-5-methylbenzimidazole | 100 | 42.2 | 0.59 |
| 1-benzoyl-2-trifluoromethyl-5-chlorobenzimidazole | 100 | 55.2 | 0.86 |
| 1-benzoyl-2-trifluoroacetamido-5-chlorobenzimidazole | 100 | 30.4 | 0.61 |
| 1-(4'-chlorobenzoyl)-2-trifluoroacetamido-5-chlorobenzimidazole | 100 | 16.1 | 0.31 |
| 1-benzoyl-2-(2'-carboxyethyl)-5-chlorobenzimidazole | 100 | 13.2 | 0.38 |
| 1-benzoyl-2-methyl-5,6-dimethoxybenzimidazole | 100 | 30.0 | 0.64 |
| 1-benzoyl-2-(2'-pyridyl)-benzimidazole | 100 | 22.4 | 0.32 |
| 1-(1'-naphthoyl)benzimidazole | 100 | 18.7 | 0.31 |
| 1-[4'-(α-benzyloxycarbonyl)-methoxybenzoyl]5,6-dimethyl-benzotriazole | 100 | 19.4 | 0.40 |
| 1-(4'-dimethylaminobenzoyl)-5-chlorobenzotriazole | 100 | 19.4 | 0.29 |
| 1-benzoyl-5-chlorobenzotriazole | 100 | 44.0 | 0.62 |
| 1-(3',4',5'-trimethoxybenzoyl)-5-chlorobenzotriazole | 100 | 28.2 | 0.46 |
| 1-(2'-6'-dimethoxybenzoyl)-5-chlorobenzotriazole | 100 | 17.0 | 0.35 |

While many of the novel compounds described herein exhibit significant anti-inflammatory activity, some of the novel compounds prepared show no activity. In Table B are listed representative examples of novel compounds which were prepared, but which exhibited no pronounced activity in the R.F.E. screen.

TABLE B

| Compound | Rat foot edema test | | |
|---|---|---|---|
| | Dosage, mg./kg. | Inhibition of edema, percent | Inhibition of edema relative effectiveness compared to aspirin |
| 1-benzoyl-5,6-dimethylbenzimidazole | 100 | 7.5 | 0.13 |
| 1-(3',4',5'-trimethoxybenzoyl)-5,6-dimethylbenzimidazole | 100 | −0.06 | |
| 1-(4'-methoxybenzoyl)-2-methyl-5,6-dimethoxybenzimidazole | 100 | −5.1 | |
| 1-(4'-chlorobenzoyl)-5-chlorobenzoyltriazole | 100 | −2.0 | −0.04 |
| 1-(4'-dimethylaminobenzoyl)-5,6-dimethylbenzotriazole | 100 | 10.9 | 0.19 |

A number of 1-aroyl benzimidazoles and benzotriazoles previously described in the prior art that we have tested do not show any pronounced activity, with but one exception, as can be seen by examining Table C.

TABLE C.—ANTI-INFLAMMATORY ACTIVITY OF SOME KNOWN BENZIMIDAZOLES AND BENZOTRIAZOLES

| Compound | Rat foot edema test | | |
|---|---|---|---|
| | Dosage, mg./kg. | Inhibition of edema, percent | Inhibition of edema relative effectiveness compared to aspirin |
| 1-benzoylbenzimidazole | 100 | −24.1 | [1] −0.54 |
| 1-(4'-methoxybenzoyl)-benzimidazole | 100 | 5.4 | [1] 0.12 |
| 1-(4'-dimethylaminobenzoyl)-benzimidazole | 100 | 17.5 | 0.35 |
| 1-benzoylbenzotriazole | 100 | 14.1 | 0.20 |
| 1-acetylbenzimidazole | 100 | −16.6 | |
| 1-(diphenylcarbamyl)-benzimidazole | 100 | 9.9 | 0.19 |
| 1-acetylbenzotriazole | 100 | −1.0 | |
| 1-acetyl-5-chlorobenzotriazole | 100 | −2.4 | |

[1] Exhibits hyperglycemic activity in rats.

Indeed, 1-benzoylbenzimidazole, the known parent compound of the 1-aroylbenzimidazoles described herein, as well as several other known compounds in the series, actually increases the edema formation. Further, several known 1-acyl benzimidazoles and benzotriazoles failed to show any significant anti-inflammatory activity (see Table B). Thus, in contrast to the known analogs, many of the novel compounds of the instant invention show superior anti-inflammatory activity and are useful in alleviating the swelling and inflammation exhibited by arthritic and rheumatic subjects.

These compounds can be administered either along or in combination with pharmaceutically-acceptable carriers. The proportion of active ingredient to carrier is determined by the solubility and chemical nature of the compound, chosen route of administration and standard pharmaceutical practice. For oral administration in capsule form, preferred excipients are lactose and high molecular weight polyethylene glycols. When aqueous suspensions are desired, the essential active ingredients are combined with emulsifying and/or suspending agents. Diluents such as ethanol, propylene glycol, glycerine and various combinations of diluents are employed. For parenteral administration, solutions of the active ingredients in combination with other solutes such as glycose or saline are used. Such aqueous solutions should be suitably buffered, if necessary, to render them isotonic.

The dosage required to reduce inflammation and swelling in arthritic and rheumatic subjects will be determined by the nature and extent of the symptoms and can be easily regulated by those skilled in the art. Generally, small dosages will be administered initially with a gradual increase in dosage until the optimum level is determined. It will generally be found that when the composition is administered orally, larger quantities of the active ingredient will be required to produce the same level as produced by a smaller quantity administered parenterally. In general, from about 0.02 to 200 mg. of active ingredient per kilogram of body weight administered in single or multiple dosage units effectively reduce inflammation and swelling in arthritic and rheumatic subjects.

Preparation of the benzimidazoles

Most of the 1-unsubstituted benzimidazoles employed as precursors in the present invention have been described in the prior art, e.g., 5,6-dimethylbenzimidazole, 2-trifluoromethylbenzimidazole. The preparations of the remaining benzimidazole precursors are described below.

2-trifluoroacetamido-5-chlorobenzimidazole

This compound is prepared by reacting 2-amino-5-chlorobenzimidazole and trifluoroacetic anhydride in pyridine according to the procedure of N. J. Leonard, D. Y. Curtin and K. M. Beck, J. Am. Chem. Soc., 69, 2459 (1947). Yield 74%; M.P. 315–16° C.

Analysis.—Calc'd for $C_9H_5ClF_3N_3O$ (percent): C, 41.01; H, 1.91; N, 15.94. Found (percent): C, 39.46; H, 1.77; N, 16.23.

Using the appropriate reactants, the following compounds may be conveniently prepared by this procedure:

2-trifluoroacetamido-4-bromobenzimidazole
2-trifluoroacetamido-5-bromobenzimidazole
2-trifluoroacetamido-5-carboxybenzimidazole
2-trifluoroacetamido-4-methylbenzimidazole
2-trifluoroacetamido-5-methylbenzimidazole 2-trifluoromethyl-5-carboxybenzimidazole Prepared from 3,4-diaminobenzoic acid and trifluoroacetic acid according to the procedure of M. A. Phillips, J. Chem. Soc., 2393 (1928). Yield 71%; M.P. 278–80° C. *Analysis.*—Calc'd for $C_9H_5F_3N_2O_2$ (percent): C, 46.96; H, 2.19; N, 12.17. Found (percent): C, 46.23; H, 2.28; N, 12.03 (0.47 ash).

Preparation of other 1-unsubstituted benzimidazoles 2-trifluorobenzimidazoles containing methyl, halo, and carboxy groups in various positions of the phenyl ring, e.g., 2-trifluoromethyl-5-methylbenzimidazole, can be conveniently prepared by the methods of E. S. Lane, J. Chem. Soc., 534 (1955) and B. C. Bishop, A. S. Jones, and J. C. Tatlow, J. Chem. Soc., 3076 (1964).

Benzotriazole precursors

The 1-unsubstituted benzotriazoles used in the present invention have all been described in the prior art.

The following examples are provided to more fully illustrate the present invention, but are not to be construed as limiting the scope thereof in any way.

EXAMPLE I

Into a 100 ml., 3-necked flask, fitted with a mechanical stirrer, dropping funnel, and drying tube, is added 2.36 g. (0.02 mole) of benzimidazole dissolved in 50 ml. of anhydrous tetrahydrofuran. Triethylamine (2.02 g., 0.02 mole) is added and the mixture is cooled to 0° C.

While the mixture is stirred vigorously at 0° C., 3.81 g. (0.02 mole) of 1-naphthoyl chloride, dissolved in a small amount of tetrahydrofuran, is added dropwise over a period of 15 minutes. The cooling bath is removed, and the reaction mixture is allowed to come to room temperature. After stirring the reaction mixture at room temperature for about 2 hours, the triethylamine hydrochloride is filtered and washed with a small amount of tetrahydrofuran. The filtrate is evaporated, and the crude 1-naphthoylbenzimidazole is recrystallized from ethyl acetate-ligroin. Yield 28%; M.P. 108–110° C.

*Analysis.*—Calc'd for $C_{18}H_{12}N_2O$ (percent): C, 79.39; H, 4.44; N, 10.29. Found (percent): C, 79.32; H, 4.62; N, 10.16.

EXAMPLE II

Employing the conditions and procedure of Example I, 0.020 mole of benzimidazole is reacted with 0.020 mole of 3,4,5-trimethoxybenzoyl chloride. The yield of 1-3′,4′,5′-trimethoxybenzoylbenzimidazole is 80%; M.P. 128–129° C.

*Analysis.*—Calc'd for $C_{17}H_{16}N_2O_4$ (percent): C, 65.37; H, 5.16; N, 8.97. Found (percent): C, 65.45; H, 5.15; N, 9.13.

EXAMPLE III

Employing the conditions and procedures of Example I, the 1-benzoylbenzimidazoles tabulated in Table I are prepared from the appropriate benzoyl chlorides and 1-unsubstituted benzimidazoles.

TABLE I

| 1-aroylbenzimidazole | M.P., °C. | Yield, percent | Calculated C | Calculated H | Calculated N | Found C | Found H | Found N |
|---|---|---|---|---|---|---|---|---|
| 1-4′-dimethylamino-5,6-dimethylbenzimidazole | 205–207 | 41 | 73.69 | 6.53 | 14.33 | 73.83 | 6.54 | 14.05 |
| 1-4′-chlorobenzoyl-2-trifluoromethylbenzimidazole | 110–120 | 56 | 55.50 | 2.48 | 8.63 | 56.19 | 2.56 | 6.67 |
| 1-benzoyl-2-2′-pyridylbenzimidazole | 134–37 | 9 | 76.24 | 4.38 | 14.04 | 76.11 | 4.11 | 14.00 |
| 1-benzoyl-2-trifluoromethyl-5-methylbenzimidazole | 91–3 | 26 | 63.15 | 3.65 | 9.21 | 63.12 | 3.68 | 9.29 |
| 1-benzoyl-2-trifluoromethyl-5-chlorobenzimidazole | 65–8 | 39 | 55.50 | 2.48 | 8.63 | 55.53 | 2.42 | 8.71 |
| 1-benzoyl-2-trifluoromethyl-5-carboxybenzimidazole | 167–69 | 65 | 57.48 | 2.70 | 8.38 | 57.33 | 2.96 | 8.27 |
| 1-4′-chlorobenzoyl-2-trifluoromethyl-5-carboxybenzimidazole | 157–60 | 61 | 52.14 | 2.19 | 7.59 | 51.96 | 2.18 | 7.69 |
| 1-benzoyl-2-trifluoroacetamido-5-chlorobenzimidazole | 228–30 | 46 | 52.27 | 2.46 | 11.43 | 51.97 | 2.80 | 11.29 |
| 1-4′-chlorobenzoyl-2-trifluoroacetamido-5-chlorobenzimidazole | 233–5 | 40 | 47.78 | 2.01 | 10.45 | 47.93 | 2.09 | 10.39 |
| 1-benzoyl-2-methyl-5,6-dimethoxybenzimidazole | 136–57 | 85 | 68.90 | 5.44 | 9.45 | 68.68 | 5.56 | 9.58 |
| 1-benzoyl-5,6-dimethylbenzimidazole | 128–29 | 75 | 76.78 | 5.64 | 11.19 | 76.95 | 5.50 | 11.38 |
| 1-(3′,4′,5′-trimethoxybenzoyl)-5,6-dimethylbenzimidazole | 155–57 | 94 | 67.04 | 5.92 | 8.23 | 66.93 | 5.89 | 8.29 |
| 1-(4′-methoxybenzoyl)-2-methyl-5,6-dimethoxybenzimidazole | 145–46 | 69 | 66.24 | 5.56 | 8.58 | 66.15 | 5.65 | 8.90 |

EXAMPLE IV

Employing the conditions and procedures of Example I, the 1-aroyl benzimidazoles listed below are readily prepared from the appropriate 1-unsubstituted benzimidazoles and benzoyl chlorides.

1-(2′-chlorobenzoyl)-2-trifluoromethyl-5-methyl-benzimidazole
1-(3′-chlorobenzoyl)-2-trifluoromethyl-5-methylbenzimidazole
1-(4′-chlorobenzoyl)-2-trifluoromethyl-5-methyl-benzimidazole
1-(2′-bromobenzoyl)-2-trifluoromethyl-5-methyl-benzimidazole
1-(4′-bromobenzoyl)-2-trifluoromethyl-5-methyl-benzimidazole
1-benzoyl-2-trifluoromethyl-4-methylbenzimidazole
1-(4′-chlorobenzoyl)-2-trifluoromethyl-4-methyl-benzimidazole
1-(3′-bromobenzoyl)-2-trifluoromethyl-4-methyl-benzimidazole
1-benzoyl-2-trifluoroacetamido-4-methylbenzimidazole
1-(3′-chlorobenzoyl)-2-trifluoroacetamido-4-methyl-benzimidazole
1-(4′-bromobenzoyl)-2-trifluoroacetamido-4-methyl-benzimidazole
1-(3′-bromobenzoyl)-2-trifluoromethyl-5-carboxy-benzimidazole
1-benzoyl-2-trifluoroacetamido-5-carboxybenzimidazole
1-(3′-chlorobenzoyl)-2-trifluoroacetamido-5-carboxy-benzimidazole
1-(2′-bromobenzoyl)-2-trifluoroacetamido-5-carboxy-benzimidazole
1-(2′-bromobenzoyl)-2-trifluoromethyl-5-chloro-benzimidazole
1-(2′-chlorobenzoyl)-2-trifluoromethyl-5-chloro-benzimidazole
1-benzoyl-2-trifluoromethyl-4-bromobenzimidazole
1-(2′-chlorobenzoyl)-2-trifluoromethyl-4-bromo-benzimidazole
1-(3′-bromobenzoyl)-2-trifluoromethyl-4-bromo-benzimidazole
1-(3′-bromobenzoyl)-2-trifluoroacetamido-5-chloro-benzimidazole
1-benzoyl-2-trifluoroacetamido-4-bromobenzimidazole
1-(4′-chlorobenzoyl)-2-trifluoroacetamido-4-bromo-benzimidazole
1-(3′-chlorobenzoyl)-2-trifluoroacetamido-4-bromo-benzimidazole 1-benzoyl-2,5,6-trimethylbenzimidazole
1-(3'-dimethylaminobenzoyl)-2,5,6-trimethylbenzimidazole
1-benzoyl-5,6-dimethoxybenzimidazole
1-(4'-dimethylaminobenzoyl)-5,6-dimethoxybenzimidazole
1-(4'-dimethylaminobenzoyl)-2-methyl-5,6-dimethoxybenzimidazole
1-(4'-chlorobenzoyl)-2-(2'-pyridyl)-benzimidazole
1-(2'-bromobenzoyl)-2-(2'-pyridyl)-benzimidazole
1-(3'-bromobenzoyl)-2-trifluoromethylbenzimidazole

EXAMPLE V

(A) Preparation of t-butyl-p-hydroxybenzoate

One mole (138 g.) of p-hydroxybenzoic acid is dissolved in 1 liter of methyl isopropyl ketone. After adding 10 ml. of a concentrated sulfuric acid, the solution is saturated at 0° C. with isobutylene. The mixture is allowed to stand at room temperature for 2 days and is then diluted with 400 ml. of ether and washed successively with 5% sodium bicarbonate solution and water. After drying the ether solution over anhydrous magnesium sulfate, it is evaporated and the crude t-butyl-p-hydroxybenzoate is recrystallized from ether-ligroin. Yield 78 g. (40%); M.P. 130–132° C.

*Analysis.*—Calc'd for $C_{11}H_{14}O_3$ (percent): C, 68.02; H, 7.27. Found (percent): C, 67.78; H, 7.28.

Similarly, t-butyl o- and m-hydroxybenzoate are prepared from o- and m-hydroxybenzoic acids, respectively.

(B) Preparation of benzyl (4-carboxyphenoxy)acetate

To a solution of 3.9 g. (0.02 mole) of t-butyl-p-hydroxybenzoate contained in 15 ml. of anhydrous dimethylformamide is added, in small portions, 1 g. of a 50% suspension of sodium hydride in mineral oil. The resultant mixture is stirred and heated to 50° C. When the evolution of hydrogen ceases, 4.2 g. (0.020 mole) of benzyl bromoacetate is added dropwise to the stirred reaction mixture over a period of 20 minutes. After stirring the resultant mixture at 50° C. for 3 hours, it is cooled and filtered. The filtrate is evaporated and the oily residue of crude benzyl(4-carbo-t-butoxyphenoxy)acetate is stirred with 20 ml. of trifluoroacetic acid at room temperature for 1 hour.

The reaction mixture is concentrated under vacuum with a rotary evaporator and the residue of benzyl (4-carboxyphenoxy)acetate is recrystallized from ethyl acetate-ligroin. Yield 4.2 g. (74%); M.P. 132–134° C.

*Analysis.*—Cal'd for $C_{16}H_{14}O_5$ (percent): C, 67.12; H, 4.93. Found (percent): C, 67.17; H, 5.08.

Similarly, benzyl (2-carboxyphenoxy)acetate and benzyl (3-carboxyphenoxy)acetate are prepared from t-butyl o-hydroxybenzoate and t-butyl-m-hydroxybenzoate, respectively.

(C) Preparation of benzyl (4-chlorocarbonylphenoxy) acetate

The benzyl (4-carboxyphenoxy)acetate prepared in B above is refluxed with thionyl chloride for about 1½ hours. The excess thionyl chloride is removed under reduced pressure with a rotary evaporator. Recrystallization from ether-ligroin gives a substantially quantitative yield of benzyl (4-chlorocarbonylphenoxy)acetate; M.P. 90–92° C.

*Analysis.*—Calc'd for $C_{16}H_{13}ClO_4$ (percent): C, 63.07; H, 4.30. Found (percent): C, 63.17; H, 4.42.

Likewise, benzyl (2-chlorocarbonylphenoxy)acetate and benzyl (3-chlorocarbonylphenoxy)acetate are prepared from benzyl (2-carboxyphenoxy)acetate and benzyl (3-carboxyphenoxy)acetate, respectively.

(D) Preparation of 1-[4'-(α-benzyloxycarbonyl)methoxybenzoyl]-2-trifluoromethylbenzimidazole 2-trifluoromethylbenzimidazole and benzyl (4-chlorocarbonylphenoxy)acetate are reacted according to the general procedure described in Example I.

The yield of 1 - [4' - (α-benzyloxycarbonyl)methoxybenzoyl]-2-trifluoromethylbenzimidazole is 52%; M.P. 114–115° C.

*Analysis.*—Calc'd for $C_{24}H_{17}F_3N_2O_4$ (percent): C, 63.41; H, 3.77; N, 6.17. Found (percent): C, 63.85; H, 3.96; N, 5.78.

Similarly, 1 - [2' - (α - benzyloxycarbonyl)methoxybenzoyl] - 2 - trifluoromethylbenzimidazole and 1-[3'-α-benzyloxycarbonyl)methoxybenzoyl] - 2 - trifluoromethylbenzimidazole are prepared from benzyl (2-chlorocarbonylphenoxy)acetate and benzyl (3-chlorocarbonylphenoxy)acetate, respectively.

(E) Preparation of 1-(4'-α-carboxymethoxybenzoyl)-2-trifluoromethylbenzimidazole 1 - [4' - (α-benzyloxycarbonyl)methoxybenzoyl]-2-trifluoromethylbenzimidazole is dissolved in tetrahydrofuran and hydrogenolyzed at 25° C. at atmospheric pressure in the presence of 5% palladium on carbon black. The catalyst is filtered and the solvent evaporated under reduced pressure with a rotary evaporator to provide a 90% yield of 1 - (4' - α-carboxymethoxybenzoyl)-2-trifluoromethylbenzimidazole; M.P. 162–164° C.

*Analysis.*—Calc'd for $C_{17}H_{11}F_3N_2O_4$ (percent): C, 56.05; H, 3.05; N, 7.70. Found (percent): C, 56.36; H, 3.40; N, 7.52.

Similarly, 1-(2'-α-carboxymethoxybenzoyl)-2-trifluoromethylbenzimidazole,
1-(3'-α-carboxymehoxybenzoyl)-2-trifluoromethylbenzimidazole are prepared from 1-[2'-α-benzyloxycarbonyl)methoxybenzoyl]-2-trifluoromethylbenzimidazole and
1-[3'-(α-benzyloxycarbonyl)methoxybenzoyl]-2-trifluoromethylbenzimidazole, respectively.

EXAMPLE VI

Employing the conditions and procedures of Examples V-(D) and V-(E), the 1-aroyl benzimidazoles in Table II, Column B, are prepared by reacting the benzyl (chlorocarbonylphenoxy)acetates listed in Table II, Column A, with the appropriate 1-unsubstituted benzimidazoles.

TABLE II

| A<br>Benzyl (chlorocarbonylphenoxy)-acetate | B<br>1-aroylbenzimidazole |
| --- | --- |
| Benzyl (4-chlorocarbonylphenoxy)-acetate. | 1-(4'-α-carboxymethoxybenzoyl)-2-(2'-pyridyl)benzimidazole. |
| Benzyl (3-chlorocarbonylphenoxy)-acetate. | 1-(3'-α-carboxymethoxybenzoyl)-2,5,6-trimethylbenzimidazole. |
| Benzyl (4-chlorocarbonylphenoxy)-acetate. | 1-(4'-α-carboxymethoxybenzoyl)-5,6-dimethoxybenzimidazole. |
| Do. | 1-(4'-α-carboxymethoxybenzoyl)-2-methyl-5,6-dimethoxybenzimidazole. |

EXAMPLE VII

(A) Preparation of 1-[4'-(α-benzyloxycarbonyl)methoxybenzyl]-5,6-dimethylbenzimidazole 5,6-dimethylbenzimidazole is reacted with benzyl (4-chlorocarbonylphenoxy)acetate according to the general procedure of Example I to provide 1-[4'-(α-benzyloxycarbonyl)methoxybenzoyl]-5,6-dimethylbenzimidazole in 48% yield; M.P. 159–160° C.

*Analysis.*—Calc'd for $C_{25}H_{22}N_2O_4$ (percent): C, 72.45; H, 5.35; N, 6.76. Found (percent): C, 72.42; H, 5.30; N, 6.81.

Similarly, the following 1-aroyl benzimidazoles can be prepared by reacting benzyl (4-chlorocarbonylphenoxy) acetate with the appropriate 1-unsubstituted benzimidazole.

1-[4'-(α-benzyloxycarbonyl)methoxybenzoyl]-2,5,6-trimethylbenzimidazole
1-[4'-(α-benzyloxycarbonyl)methoxybenzoyl]-5,6-dimethoxybenzimidazole
1-[4'-(α-benzyloxycarbonyl)methoxybenzoyl]-2-methyl-5,6-dimethoxybenzimidazole.

(B) Preparation of 1-(4'-α-carboxymethoxybenzoyl)-5,6-dimethylbenzimidazole

Hydrogenolysis of 1-[4'-(α - benzyloxycarbonyl)methoxybenzoyl]-5,6-dimethylbenzimidazole according to the procedure of Example V–(E) provides 1-(4'-α-carboxymethoxybenzoyl) - 5,6-dimethylbenzimidazole; M.P. 188–190° C.

Analysis.—Calc'd for $C_{18}H_{16}N_2O_4$ (percent): C, 66.66; H, 4.97; N, 8.64. Found (percent): C, 66.26; H, 5:16; N, 8.64.

Similarly, the remaining benzyl esters listed in A above can be converted to their respective acids.

EXAMPLE VIII p-Carbobenzoxybenzoyl chloride is prepared according to the procedure of H. Fahn and B. Seidel, Makromol. Chem., 19, 71 (1959) and reacted with 5,6-dimethylbenzimidazole according to the general procedure of Example I to give 1-(4'-carbobenzoxybenzoyl)-5,6-dimethylbenzimidazole in 55% yield; M.P. 147–150° C.

Hydrogenolysis of 1-(4'-carbobenzoxybenzoyl)-5,6-dimethylbenzimidazole according to the procedure of Example V–(E) affords 1-(4'-carboxybenzoyl)-5,6-dimethylbenzimidaole in 70% yield; M.P. 290–308° C.

Analysis.—Calc'd for $C_{17}H_{14}N_2O_3$ (percent): C, 69.37; H, 4.80; N, 9.52. Found (percent): C, 69.40; H, 5.06; N, 9.02.

EXAMPLE IX

The 1-aroyl benzimidazoles below can be prepared from p-carbobenzoxybenzoyl chloride and the appropriate benzimidazoles according to the procedure of Example VIII.

1-(4'-carboxybenzoyl)-5,6-dimethoxybenzimidazole
1-(4'-carboxybenzoyl)-2-methyl-5,6-dimethoxybenzimidazole
1-(4'-carboxybenzoyl)-2,5,6-trimethylbenzimidazole.

EXAMPLE X (A) 2-(2'-carbobenzoxyethyl)-5-chlorobenzimidazole

Into a 1-liter, 3-necked flask, fitted with a stirrer, dropping funnel, immersion thermometer, and reflux condenser, containing 250 ml. of benzyl alcohol, is added 22.5 g. (0.10 mole) of 2-(2'-carboxyethyl)-5-chlorobenzimidazole, prepared according to the procedure of A. T. James and E. E. Turner, J. Chem. Soc., 1515 (1950). To this stirred suspension at 10° C., is added dropwise 40 ml. of thionyl chloride. After the addition is complete, the mixture is slowly heated to 100° C. and stirred at this temperature for 4 hours. The reaction mixture is cooled, 300 ml. of ether is added, and the mixture is stored in the refrigerator overnight. The crystals of the benzyl ester, i.e., 2-(2'-carbobenzoxyethyl)-5-chlorobenzimidazole are filtered and dissolved in chloroform. The chloroform solution is washed successively with a 5% solution of sodium carbonate and water, dried, and evaporated. Recrystallization from chloroform-ligroin provides 9.6 g. (31%) of pure product, M.P. 131–132° C.

Analysis.—Calc'd for $C_{17}H_{15}ClN_2O_2$ (percent): C, 64.87; H, 4.80; N, 8.90. Found (percent): C, 64.88; H, 4.65; N, 8.70.

2-(2'-carbobenzoxyethyl) - 5 - chlorobenzimidazole is reacted with benzoyl chloride according to the general procedure of Example I to give a 74% yield of 1-benzoyl-(2'-carbobenzoxyethyl) - 5 - chlorobenzimidazole; M.P. 78–82° C.

(B) Preparation of 1-benzoyl-2-(2'-carboxyethyl)-5-chlorobenzimidazole

Hydrogenolysis of 1-benzoyl -2-(2'-carbobenzoxyethyl)-5-chlorobenzimidazole according to the procedure of Example V–(E) affords a 64% yield of 1-benzoyl-2-(2'-carboxyethyl)-5-chlorobenzimidazole; M.P. 112–116° C.

Analysis.—Calc'd for $C_{17}H_{13}ClN_2O_3$ (percent): C, 62.12; H, 3.98; N, 8.52. Found (percent): C, 62.26; H, 4.39; N, 8.72.

Similarly, 1,4' - chlorobenzoyl-2-(2' - carboxyethyl)-5-chlorobenzimidazole and 1,4'-bromobenzoyl-2-(2'-carboxyethyl)-5-bromobenzimidazole are prepared according to the above procedures using p-chlorobenzoyl chloride and p-bromobenzoyl chloride, respectively, instead of benzoyl chloride.

EXAMPLE XI

The benzimidazoles in Column A of Table III, prepared according to the procedure of A. T. James and E. E. Turner, J. Chem. Soc., 1515 (1950), are reacted with the appropriate benzoyl chlorides in accordance with the procedure described in Example X to give the 1-aroyl-benzimidazoles in Table III, Column B.

TABLE III

| A | B |
| --- | --- |
| 2-(2'-carboxyethyl)-5-bromobenzimidazole. | 1-benzoyl-2-(2'-carboxyethyl)-5-bromobenzimidazole. |
| Do. | 1-(3'-chlorobenzoyl)-2-(2'-carboxyethyl)-5-bromobenzimidazole. |
| Do. | 1-(2'-bromobenzoyl)-2-(2'-carboxyethyl)-5-bromobenzimidazole. |
| 2-(2'-carboxyethyl)-5-methylbenzimidazole. | 1-benzoyl-2-(2'-carboxyethyl)-5-methylbenzimidazole. |
| Do. | 1(4'-chlorobenzoyl)-2-(2'-carboxyethyl)-5-methylbenzimidazole. |
| Do. | 1-(3'-bromobenzoyl)-2-(2'-carboxyethyl)-5-methylbenzimidazole. |

EXAMPLE XII

A solution of 0.10 mole of 2-(2'-carboxyethyl)-5-carboxybenzimidazole, prepared according to the procedure of A. T. James and E. E. Turner, J. Chem. Soc., 1515 (1950), in about 200 ml. of benzyl alcohol is treated with about 50 ml. of thionyl chloride in the manner described in Example X-(A).

The resultant dibenzyl ester, i.e. 2-(2'-carbobenzoxyethyl) - 5 - carbobenzoxybenzimidazole, is reacted with benzoyl chloride, according to the procedure described in Example I to give 1-benzoyl-2-(2'-carbobenzoxyethyl)-5-carbobenzoxybenzimidazole.

Hydrogenolysis of this latter compound according to the procedure of Example V–(E) provides 1-benzoyl-2-(2'-carboxyethyl)-5-carboxybenzimidazole.

1-(4'-chlorobenzoyl)-2-(2'-carboxyethyl) - 5 - carboxybenzimidazole and 1 - 4' - bromobenzoyl-2-(2'-carboxyethyl)-5-carboxybenzimidazole can be similarly prepared by reacting p-chlorobenzoyl chloride and p-bromobenzoyl chloride, respectively, with 2-(2'-carbobenzoxyethyl)-5-carbobenzoxybenzimidazole and hydrogenolyzing the resultant products according to the procedure of Example V-(E).

EXAMPLE XIII (A) Preparation of I-aroyl benzotriazoles

The 1-benzoyltriazoles in Table IV are prepared by reacting the appropriate benzoyl chlorides and benzotriazoles according to the general procedure of Example I.

TABLE IV

| 1-aroyl benzotriazole | M.P., °C. | Yield, percent | Calculated C | Calculated H | Calculated N | Found C | Found H | Found N |
|---|---|---|---|---|---|---|---|---|
| 1-(4'-carbobenzoxymethoxybenzoyl)-5,6-dimethylbenzotriazole | 130–31 | 85 | 69.38 | 5.10 | 10.12 | 69.43 | 5.08 | 9.82 |
| 1-benzoyl-5-chlorobenzotriazole | 99–101 | 80 | 60.58 | 3.13 | 16.31 | 60.06 | 2.96 | 16.02 |
| 1-(4'-dimethylaminobenzoyl)-5-chlorobenzotriazole | 130–32 | 26 | 59.90 | 4.35 | 18.66 | 59.56 | 4.27 | 18.65 |
| 1-(3',4',5'-trimethoxybenzoyl)-5-chlorobenzotriazole | 165–72 | 30 | 55.33 | 4.06 | 12.09 | 55.11 | 3.94 | 12.41 |
| 1-(2',6'-dimethoxybenzoyl)-5-chlorobenzotriazole | 180–81 | 11 | 56.70 | 3.80 | 13.23 | 56.73 | 4.05 | 13.35 |
| 1-(4'-chlorobenzoyl)-5-chlorobenzotriazole | 134–38 | 62 | 53.45 | 2.41 | 14.38 | 53.70 | 2.76 | 14.19 |
| 1-(4'-dimethylaminobenzoyl)-5,6-dimethylbenzotriazole | 197–98 | 20 | 69.37 | 6.16 | 19.04 | 69.55 | 6.01 | 19.05 |

EXAMPLE XIV

The 1-benzoylbenzotriazoles listed below are conveniently prepared by reacting the appropriate benzotriazoles and benzoyl chlorides according to the procedure of Example I.

1-benzoyl-5-bromobenzotriazole
1-(3'-dimethylaminobenzoyl)-5-bromobenzotriazole
1-(3',4',5'-trimethoxybenzoyl)-5-bromobenzotriazole
1-(2',6'-dimethoxybenzoyl)-5-bromobenzotriazole

What is claimed is:
1. A compound of the formula

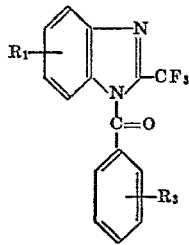

wherein $R_1$ is $CH_3$, $CO_2H$, Cl or Br and $R_3$ is Cl or Br.

2. The compound of claim 1 wherein $R_1$ is 5-$CO_2H$ and $R_3$ is 4-Cl.

3. A compound of the formula

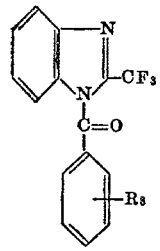

wherein $R_8$ is Br, Cl or —$OCH_2CO_2H$.

4. The compound of claim 3 wherein $R_8$ is 4-$OCH_2CO_2H$

References Cited

FOREIGN PATENTS

| | | | |
|---|---|---|---|
| 1,426,887 | 12/1965 | France | 260—309.2 |
| | | (Addition to No. 90,296) | |
| 1,426,887 | 10/1967 | France | 260—309.2 |
| 1,430,139 | 1/1966 | France | 260—309.2 |
| 6609819 | 1/1967 | Netherlands | 260—309.2 |
| 1,151,424 | 5/1969 | Great Britain | 260—309.2 |

OTHER REFERENCES

Morgan: J. Chem. Soc. (London) 1961, pp. 2343–7.

NATALIE TROUSOF, Primary Examiner

UNITED STATES PATENT OFFICE
CERTIFICATE OF CORRECTION

Patent No. 3,751,428      Dated August 7, 1973

Inventor(s) Reinhard Sarges

It is certified that error appears in the above-identified patent and that said Letters Patent are hereby corrected as shown below:

Col. 2, lines 47-53, that portion of the formula reading

" 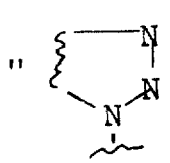 "    should read --   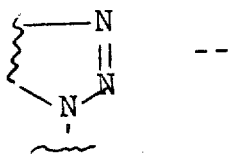   --

Col. 3, line 34, "isybutylene" should read -- isobutylene --.

Col. 6, line 29, "along" should read -- alone --.

Col. 8, line 22, "136-57" should read -- 136-37 --.

Signed and sealed this 19th day of February 1974.

(SEAL)
Attest:

EDWARD M. FLETCHER, JR.
Attesting Officer

C. MARSHALL DANN
Commissioner of Patents